UNITED STATES PATENT OFFICE.

HENRY STALAY ARTHUR HOLT, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

PROCESS OF MAKING INDIGO COLORING-MATTER.

No. 820,869.     Specification of Letters Patent.     Patented May 15, 1906.

Application filed December 4, 1905. Serial No. 290,278.

*To all whom it may concern:*

Be it known that I, HENRY STALAY ARTHUR HOLT, doctor of philosophy and chemist, a subject of the King of England, residing at Ludwigshafen-on-the-Rhine, in the Kingdom of Bavaria, German Empire, have invented new and useful Improvements in the Production of Indigo Coloring-Matters, of which the following is a specification.

When air is passed through an alkaline solution of a leuco indigo compound, the indigo has a tendency to separate out in a finely-crystalline condition, which is less suitable for use, especially for dyeing and printing, than is a very finely-divided condition. I have discovered that indigo can be obtained in the desirable very finely-divided condition, and therefore in a condition very advantageous for use for all purposes, by causing the oxidation to take place in the presence of a soap, which may be done by adding to the alkaline solution of the leuco indigo compound before passing air through it a saturated fatty acid or an unsaturated fatty acid or a resin acid or an alkali salt of any of such acids. I find soft soap particularly useful for the purposes of my invention. Instead of air other suitable oxidizing agent may be employed in carrying out my invention.

The following are examples of how my invention can be performed using air as the oxidizing agent; but my invention is not confined to these examples. The parts are by weight.

Example 1: Dissolve one hundred (100) parts of indoxylic acid in two thousand five hundred (2,500) parts of water to which the necessary quantity of caustic soda has been added. Then add ten (10) parts of soft soap (or other alkali salt of a fatty acid or of a resin acid—such, for instance, as the alkali salt of palmitic acid, of linoleic acid, of erucic acid, or of ricinoleic acid) and then while boiling oxidize by passing a current of air through the solution.

Example 2: Dissolve ten (10) parts of indigo white in seventy (70) parts of water and the necessary quantity of caustic alkali, add three (3) parts of Turkey-red oil, and pass a strong current of air through the solution, the indigo being precipitated in a very fine condition. The suspension is treated with common salt before it is filtered.

Now what I claim is—

1. The process for the production of finely-divided indigo by oxidizing an alkali solution of a leuco indigo compound in the presence of a soap.

2. The process for the production of finely-divided indigo by oxidizing an alkali solution of a leuco indigo compound in the presence of soft soap.

In testimony whereof I have hereunto set my hand in the presence of two subscribing witnesses.

HENRY STALAY ARTHUR HOLT.

Witnesses:
    J. ALEC. LLOYD,
    JOS. H. LEUTE.